(No Model.)
T. E. THOMPSON.
CAR BRAKE ADJUSTER.
No. 495,191. Patented Apr. 11, 1893.
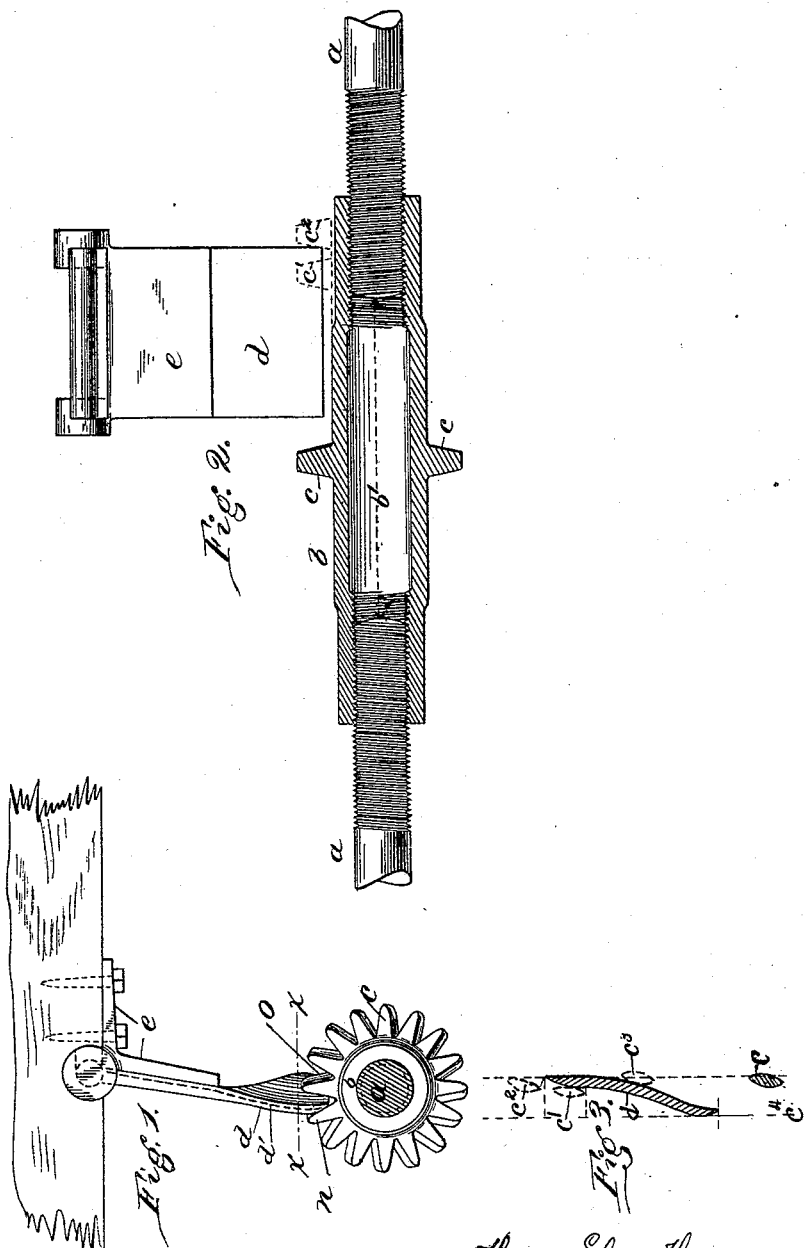

UNITED STATES PATENT OFFICE.

THOMAS ELWOOD THOMPSON, OF CHICAGO, ILLINOIS.

CAR-BRAKE ADJUSTER.

SPECIFICATION forming part of Letters Patent No. 495,191, dated April 11, 1893.

Application filed April 27, 1892. Serial No. 430,873. (No model.)

*To all whom it may concern:*

Be it known that I, THOMAS ELWOOD THOMPSON, a citizen of the United States, residing at Chicago, in the county of Cook and State of Illinois, have invented a new and useful Improvement in Automatic Car-Brake Adjusters, of which the following is a specification.

My invention relates to an improvement in automatic car brake slack adjusters so that the slack from wear will be taken up slightly at short intervals keeping the driving power at a desired limit, rendering it much more reliable, effective and uniform in general service.

My invention consists in mechanism whereby the above objects are attained, which consist in a pawl suspended from a rest plate having a diagonal point to impart and "not to retard motion." Engaging with it is a worm gear on a turn-buckle attached to one of the car brake connections, which has the desired effect of shortening the rod in slight degrees from time to time as the brake shoes and the connections wear.

In the drawings Figure 1 is a transverse view of my device. Fig. 2 is a longitudinal view, and Fig. 3 is a section of the pawl on the line X X in Fig. 1.

The operation of the above mechanism needs only a brief description, which is as follows: As the gear $c$ on turnbuckle $b$ is drawn forward from its normal position when brakes are being set the gear engages the pawl $d$ at $c^3$ and slightly tilts it away from the rest plate $e$ to the dotted line $d'$ and when by reason of wear of brake-shoes and connections the gear $c$ reaches the desired limit of its motion indicated in dotted lines at $c^2$ the pawl then drops back against the rest plate $e$ and when the brakes are released the tooth $o$ is now in position to engage the other side of the pawl which after the brake tension is released in backward movement engages the cam surface of the pawl at $c'$. It is then turned to the dotted lines $c^4$ and assumes the position of tooth $n$; the turn-buckle $b$ is now turned on the threaded brake connection $a$ $a$ one sixteenth of a revolution and shortens it about one sixty fourth of an inch. The rod being thus shortened the next number of times the brakes are operated will only tilt the pawl slightly but will not pass it again, until there is some more wear of brake shoes and connection, sufficient to reach the limit at $c^2$ when the above operation will be repeated, and will be from time to time until the brake shoes are worn out. The ends of the brake rod connection $a$ $a$ will then have been drawn inward in the turn-buckle $b$ until the space $b'$ is approximately filled.

The same result may readily be attained by a little modification in above construction, possibly with the same diversity as exists in car-couplers.

I claim—

1. A worm geared turn-buckle $b$, on a brake rod mechanism in combination with a cam or diagonal pointed pawl $d$ substantially as and for the purpose set forth.

2. A cam suspended from and pivoted in a brace plate in combination with a worm gear on the brake connections to take up the slack, when the brake tension is off the rods; substantially as and for the purpose set forth.

3. In a car brake mechanism the combination of rod $a$ and wormed turn-buckle $b$ with the pawl $d$ and rest plate $e$ substantially as and for the purpose set forth.

4. In a car brake mechanism the combination of the worm gear $c$ upon the movable rod $a$ and a pawl or cam mechanism to shorten it at intervals substantially as and for the purpose set forth.

THOMAS ELWOOD THOMPSON.

Witnesses:
 SAMUEL J. HARMON,
 THEO. STOFFREGEN.